June 2, 1964 R. W. DE MONTE 3,135,930

IMPEDANCE-SIMULATING NETWORK

Filed May 12, 1961 2 Sheets-Sheet 1

INVENTOR
R. W. DE MONTE

BY

Ralph T. Holcomb
ATTORNEY

INVENTOR
R. W. DE MONTE
BY
Ralph T. Holcomb
ATTORNEY 3,135,930
IMPEDANCE-SIMULATING NETWORK
Robert W. De Monte, Berkeley Heights, N.J., assignor to Bell Telephone Laboratories, Incorporated, New York, N.Y., a corporation of New York
Filed May 12, 1961, Ser. No. 109,615
8 Claims. (Cl. 333—23)

This invention relates to wave transmission networks and more particularly to a two-terminal, impedance-simulating network for use with a loaded transmission line.

The object of the invention is to simulate the characteristic impedance of a periodically loaded transmission line terminated in a fractional section. A further object is to improve the simulation in the neighborhood of the cut-off frequency of the line, and at higher frequencies.

In building up artificial lines, two-terminal networks are often required to terminate electrically short transmission lines which have periodical, inductive loading. In some instances, the impedance of the network must simulate the characteristic impedance of the line quite closely over a very wide band of frequencies, including the cut-off frequency and above. Such networks also find extensive use as line balances in repeater circuits with hybrid coils.

Zobel, in Patent 1,850,146, issued March 22, 1932, has shown how to design simulating networks which are quite accurate up to about .97 of the cut-off. The circuit includes a basic network and a supplementary low-frequency corrector. The basic network is a double m-derived, low-pass, filter section terminated in a resistor. However, these networks are not sufficiently accurate in the vicinity of the cut-off and beyond for many present-day uses.

The impedance-simulating network in accordance with the present invention uses the Zobel network as a prototype but adds two resistors. The values of these resistors are uniquely determined so that the impedance of the network exactly matches that of the line, in both resistance and reactance, at the cut-off. Also, the match on each side of the cut-off is greatly improved. A low-frequency corrector and a high-frequency corrector may be added, if required. The latter may be a series branch including an inductor and a resistor connected in parallel.

The nature of the invention and its various objects, features, and advantages will appear more fully in the following detailed description of a typical embodiment illustrated in the accompanying drawing, of which FIG. 1 is a block diagram of a two-terminal, impedance-simulating network in accordance with the invention;

Figure 1:
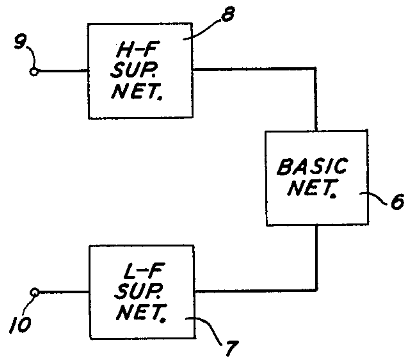

The impedance-simulating network shown in FIG. 1 comprises a basic network 6, a low-frequency supplementary network 7, and a high-frequency supplementary network 8 connected in series between terminals 9 and 10. When not required, either or both of the networks 7 and 8 may be omitted.

Figure 2:
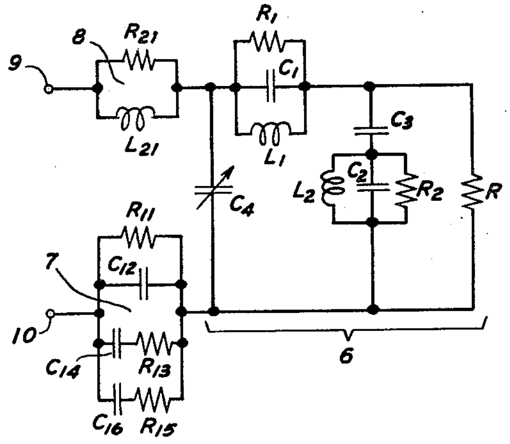
FIG. 2 is a schematic circuit of an embodiment of the network of FIG. 1.
Figure 3:
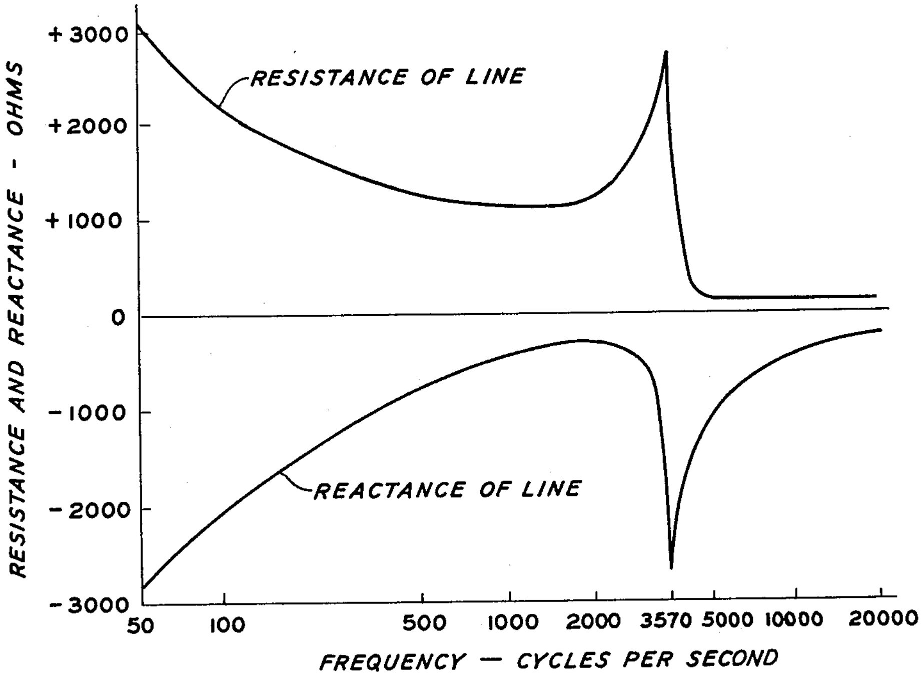
FIG. 3 is a plot of the image impedance versus frequency for a typical loaded line to be simulated.

A typical embodiment is shown in FIG. 2. This network simulates the midsection impedance of a 26-gauge copper cable with loading coils spaced 6,000 feet apart. In this line, $C_0$, the capacitance of the line per section including the capacitance between the windings of the loading coil, is .08990 microfarad and $L_0$, the inductance of the line per section including the loading inductance, is .08840 henry. The values of $C_0$ and $L_0$ used are those found at the cut-off frequency $f_c$, defined as $$f_c = 1/\pi\sqrt{L_0/C_0} \qquad (1)$$

which is 3570 cycles per second in the present example. The resistance and reactance characteristics are shown in FIG. 3 over the frequency range of 50 to 20,000 cycles per second.

The basic network 6 is in the form of a midshunt, double m-derived, low-pass filter section terminated in its characteristic impedance as shown in FIG. 20 of the above-mentioned Zobel patent. The values of the parameters $m$ and $m'$ are .7230 and .4134, respectively. The filter is a pi-type section with two shunt impedance branches and an interposed series impedance branch. The first shunt branch includes a capacitor of value $C_4$ connected through the networks 7 and 8 to the terminals 9 and 10. The series branch includes the parallel combination of a capacitor of value $C_1$ and an inductor of value $L_1$. The second shunt branch is made up of a capacitor of value $C_3$ connected in series with the parallel combination of a capacitor of value $C_2$ and an inductor of value $L_2$. A terminating resistor of value R is shunted across the second shunt branch. These elements have the following values:

$$C_1 = .2335\ C_0 \qquad (2)$$

$$C_2 = .1646\ C_0 \qquad (3)$$

$$C_3 = .1494\ C_0 \qquad (4)$$

$$L_1 = .5110\ L_0 \qquad (5)$$

$$L_2 = .7250\ L_0 \qquad (6)$$

$$R = \sqrt{L_0/C_0} \qquad (7)$$

The capacitor $C_4$ has the value $$C_4 = .3615\ C_0 \qquad (8)$$

when the line is terminated at midsection. If the termination is other than midsection, the value of $C_4$ is adjusted to allow for the difference between $C_0/2$ and the actual capacity of the fractional end section. Thus, any end section between .1385 and full can be simulated simply by properly choosing or adjusting $C_4$. This capacitor may be made variable, as indicated by the arrow, to facilitate this adjustment.

Figure 4:
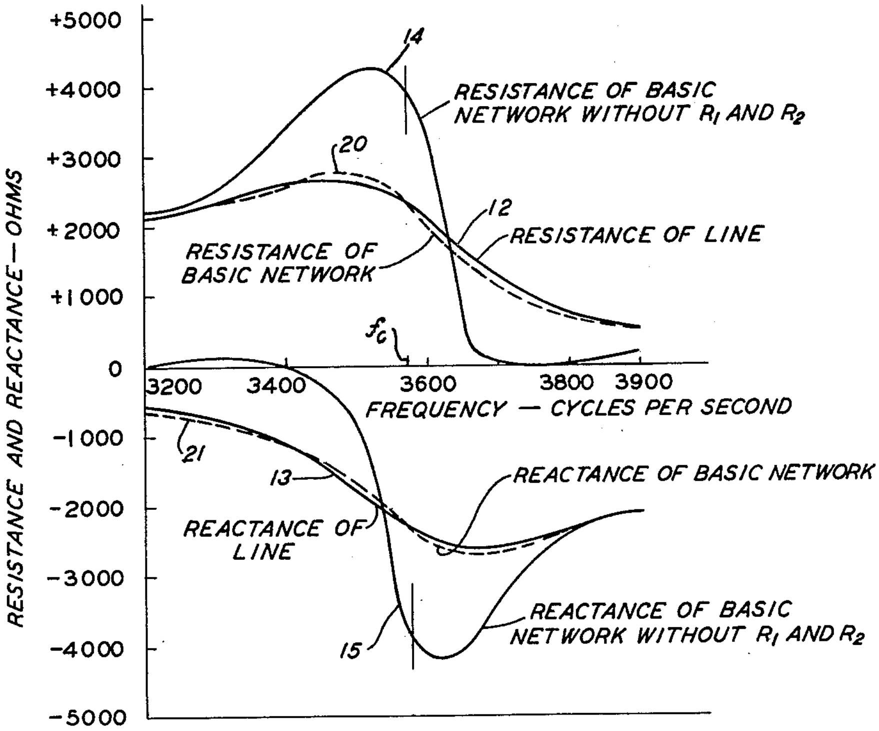
FIG. 4 is a plot showing the characteristic of FIG. 3 in the vicinity of the cut-off to a larger scale and, for comparison, simulating characteristics obtainable with a prior-art structure and with the present network.

FIG. 4 shows the simulation obtained with the basic network 6, without resistors $R_1$ and $R_2$, over the frequency range from 3200 to 3900 cycles per second. The solid-line curves 12 and 13 show the resistance and reactance, respectively, of the line. The solid-line curves 14 and 15 show the resistance and reactance, respectively, of the basic network 6, minus $R_1$ and $R_2$, assuming a ratio of reactance to resistance of 200 for the inductors $L_1$ and $L_2$. At $f_c$, it is seen that the deviation between the desired and the obtained curves is around 1,700 ohms, nearly 70 percent. Such a large mismatch at $f_c$ reduces the return loss to around ten decibels, considerably lower than is tolerable in many transmission systems.

In accordance with the present invention, the impedance match in the vicinity of $f_c$ is greatly improved by the addition of a resistor of value $R_1$ in shunt with $L_1$ and a resistor of value $R_2$ in shunt with $L_2$. The values of these resistors are so chosen that the impedance of the network matches the impedance of the line in both resistance and reactance at the frequency where the impedance components of the line are equal. It will be seen from the curves 12 and 13 in FIG. 4 that this occurs only at, or very close to, $f_c$.

The required values may be found by trial or by computation. To find them by computation, two independent expressions for the required resistance and the reactance may be set up with $R_1$ and $R_2$ the only unknowns. Solving these equations simultaneously gives the values of $R_1$ and $R_2$ to be used in the network.

Figure 5:
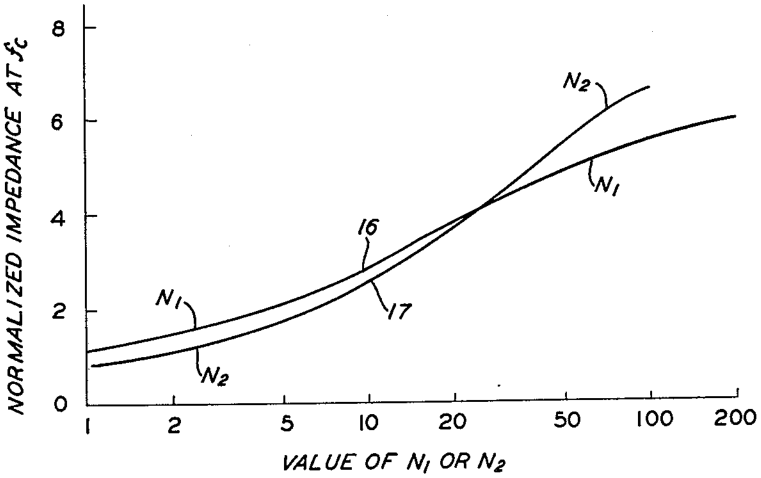
FIG. 5 is a plot of curves useful in finding the required values for the two added resistors in the present simulator.

The curves shown in FIG. 5 have been prepared to facilitate the evaluation of $R_1$ and $R_2$. Let $$R_1 = N_1 R \quad (9)$$
$$R_2 = N_2 R \quad (10)$$

where $N_1$ and $N_2$ are factors dependent upon the ratio, K, of the modulus of the line impedance $Z_K$ at $f_c$ to R. In FIG. 5, the curve 16 gives the value of $N_1$ for any value of K between about one and six, and the curve 17 gives the value of $N_2$. In the present example, the modulus of $Z_K$ is 3170 and R is 992, so K is 3170/992, or 3.2. When K is 3.2, curve 16 shows that $N_1$ is 12.4 and curve 17 gives 16.3 for $N_2$. Therefore, $$R_1 = N_1 R = 12.4 \times 992 = 12{,}230 \text{ ohms} \quad (11)$$
$$R_2 = N_2 R = 16.3 \times 992 = 16{,}150 \text{ ohms} \quad (12)$$

In the example, the other elements have the following values:

$C_1$=.02098 microfarad
$C_2$=.01479 microfarad
$C_3$=.01343 microfarad
$C_4$=.03249 microfarad
$L_1$=.04520 henry
$L_2$=.06413 henry The curves 16 and 17 in FIG. 5 have been prepared on the assumption that the dissipation in the inductors $L_1$ and $L_2$ may be neglected. However, any dissipation in these inductors increases the deviation between the desired impedance and the impedance of the network. For example, if the ratio of reactance to resistance at $f_c$ is 200, the deviation will be increased by approximately 50 percent. The effect of this dissipation may be compensated to a great extent in the vicinity of $f_c$ by increasing the value of the associated resistor by an appropriate amount. Thus, if the resistance associated with $L_1$ is $R_a$, $R_1$ should be increased to a value $R_1'$, given by $$R_1' = \frac{\left(\frac{2\pi f_c L_1}{R_a}\right)^2}{\frac{(2\pi f_c L_1)^2}{R_1 R_a} - 1} \quad (13)$$

and if $R_b$ is the resistance associated with $L_2$, the adjusted value of $R_2$ is $$R_2' = \frac{\left(\frac{2\pi f_c L_2}{R_b}\right)^2}{\frac{(2\pi f_c L_2)^2}{R_2 R_b} - 1} \quad (14)$$

As an example, if the ratio of reactance to resistance in each inductor is 200, then $R_1$ should be increased by 1,000 ohms to 13,230 ohms, and $R_2$ by 2,600 ohms to 18,750 ohms.

The resistance and reactance of that basic section in the neighborhood of $f_c$, using the adjusted values of $R_1$ and $R_2$, are shown in FIG. 4 by the broken-line curves 20 and 21, respectively. It is seen that the simulation, as compared with the curves 14 and 15, is greatly improved.

With the aid of the Formulas 2 to 8 and the curves 16 and 17, basic networks to simulate a wide variety of loaded lines may be designed easily and quickly. The match obtained will be substantially as close as that shown in FIG. 4 for the present example.

If good simulation must extend down to comparatively low frequencies, as is often the case, the low-frequency supplementary network 7 is added. This is a two-terminal structure comprising three resistors and three capacitors, arranged in four branches. These are constituted by a resistor of value $R_{11}$, a capacitor of value $C_{12}$, the series combination of a resistor of value $R_{13}$ and a capacitor of value $C_{14}$, and the series combination of a resistor of value $R_{15}$ and a capacitor of value $C_{16}$. Each combination of resistor and capacitor is capable of insuring a match at one selected frequency. Thus, the six elements shown can be designed to provide a match at three chosen frequencies. In the present example, these frequencies are 50, 200, and 650 cycles per second. The elements have the following values:

$R_{11}$=13051 ohms
$R_{13}$=4197 ohms.
$R_{15}$=6958 ohms.
$C_{12}$=.3560 microfarad
$C_{14}$=.1424 microfarad
$C_{16}$=.4197 microfarad The high-frequency supplementary network 8 is added if close simulation is required above $f_c$. This is a two-terminal network connected in series with the basic network 6 and the low-frequency network 7. The network 8 comprises a resistor of value $R_{21}$ and an inductor of value $L_{21}$ connected in parallel. By proper design, this network will insure an impedance match at a selected frequency above $f_c$. In the example, this frequency is chosen as 8000 cycles per second. The elements have the following values:

$R_{21}$=120 ohms
$L_{21}$=.001194 henry

Of course, a match may be obtained at additional frequencies above $f_c$ by adding additional pairs of elements to the network 8. In general, the addition of each parallel branch comprising the series combination of a resistor and an inductor insures a match at one additional frequency above $f_c$.

It is to be understood that the above-described arrangement is only illustrative of the application of the principles of the invention. Numerous other arrangements may be devised by those skilled in the art without departing from the spirit and scope of the invention.

What is claimed is:

1. A two-terminal network adapted to simulate the impedance $Z_K$ of a loaded transmission line terminated in a fractional section over a frequency band including the cut-off frequency $f_c$ comprising a pi-type section and a terminating resistor of value R, the section comprising two shunt impedance branches and an interposed series impedance branch, the first shunt branch including a capacitor of value $C_4$ connected between the network terminals, the series branch including the parallel combination of a capacitor of value $C_1$, an inductor of value $L_1$, and a resistor of value $R_1$, the second shunt branch including a capacitor of value $C_3$ connected in series with the parallel combination of a capacitor of value $C_2$, an inductor of value $L_2$, and a resistor of value $R_2$, and the terminating resistor being connected across the second shunt branch, in which $$C_1 = .2335\, C_0$$
$$C_2 = .1646\, C_0$$
$$C_3 = .1494\, C_0$$
$$L_2 = .5110\, L_0$$
$$L_2 = .7250\, L_0$$
$$L_0 = R/\pi f_c$$
$$C_0 = 1/\pi f_c R$$
$$R = \sqrt{L_0/C_0}$$

$L_0$ is the inductance of the line per section including the loading inductance, $C_0$ is the capacitance of the line per section including the capacitance associated with the loading inductance, $C_4$ depends upon $C_0$ and the length of the terminal section of line, and $R_1$ equals $N_1R$ and $R_2$ equals $N_2R$ where $N_1$ and $N_2$ are determined by the ratio of the modulus of the line impedance $Z_K$ at $f_c$ to R.

2. A network in accordance with claim 1 in which the dissipation in the inductors is taken into account in determing the values of $R_1$ and $R_2$ so that $R_1$ is determined by the equation $$R_1=\frac{\left(\frac{2\pi f_c L_1}{R_a}\right)^2}{\frac{(2\pi f_c L_1)^2}{R_1 R_a}-1}$$

and $R_2$ is determined by the equation $$R_2=\frac{\left(\frac{2\pi f_c L_2}{R_b}\right)^2}{\frac{(2\pi f_c L_2)^2}{R_2 R_b}-1}$$

where $R_a$ is the resistance of inductor $L_1$ and $R_b$ is the resistance of inductor $L_2$.

3. A network adapted to simulate the midsection impedances $Z_K$ of a loaded transmission line over a frequency band including the cut-off frequency $f_c$ comprising two parallel paths, one of the paths comprising a capacitor of value $C_4$, the other path comprising two impedances connected in series, one of the impedances comprising the parallel combination of a capacitor of value $C_1$, an inductor of value $L_1$, and a resistor of value $R_1$, the other impedance comprising a resistor of value R shunted by a branch comprising a capacitor of value $C_3$ connected in series with the parallel combination of a capacitor of value $C_2$, an inductor of value $L_2$, and a resistor of value $R_2$, in which $$C_1=.2335\ C_0$$
$$C_2=.1646\ C_0$$
$$C_3=.1494\ C_0$$
$$C_4=.3615\ C_0$$
$$L_1=.5110\ L_0$$
$$L_2=.7250\ L_0$$
$$L_0=R/\pi f_c$$
$$C_0=1\pi f_c R$$
$$R=\sqrt{L_0/C_0}$$

$L_0$ is the inductance of the line per section including the loading inductance, $C_0$ is the capacitance of the line per section including the capacitance associated with the loading inductance, and $R_1$ equals $N_1R$ and $R_2$ equals $N_2R$ where $N_1$ and $N_2$ are determined by the ratio of the modulus of the line impedance $Z_K$ at $f_c$ to R.

4. A network adapted to simulate the impedances $Z_K$ of a loaded transmission line terminated in a fractional section comprising a basic network and a high-frequency supplementary network connected in series, the basic network comprising two parallel paths, one of the paths comprising a capacitor of value $C_4$, the other path comprising two impedances connected in series, one of the impedances comprising the parallel combination of a capacitor of value $C_1$, an inductor of value $L_1$, and a resistor of value $R_1$, the other impedance comprising a resistor of value R shunted by a branch comprising a capacitor of value $C_3$ connected in series with the parallel combination of a capacitor of value $C_2$, an inductor of value $L_2$, and a resistor of value $R_2$, in which $$C_1=.2335\ C_0$$
$$C_2=.1646\ C_0$$
$$C_3=.1494\ C_0$$
$$L_1=.5110\ L_0$$
$$L_2=.7250\ L_0$$

$$L_0=R/\pi f_c$$
$$C_0=1/\pi f_c R$$
$$R=\sqrt{L_0/L_0}$$

$L_0$ is the inductance of the line per section including the loading inductance, $C_0$ is the capacitance of the line per section including the capacitance associated with the loading inductance, $f_c$ is the cut-off frequency of the line, $C_4$ depends upon $C_0$ and the length of the terminal section of line, $R_1$ equals $N_1R$ and $R_2$ equals $N_2R$ where $N_1$ and $N_2$ are determined by the ratio of the modulus of the line impedance $Z_K$ at $f_c$ to R and the supplementary network is adapted to improve the simulation in the frequency range above $f_c$.

5. A network in accordance with claim 4 in which the supplementary network comprises the parallel combination of an inductor and a resistor.

6. In combination, a network in accordance with claim 4 and a low-frequency supplementary network connected in series therewith, the last-mentioned network being adapted to improve the simulation in the frequency range below cut-off.

7. A network in accordance with claim 3 in which the dissipation in the inductors is taken into account in determining the values of $R_1$ and $R_2$ so that $R_1$ is determined by the equation $$R_1=\frac{\left(\frac{2\pi f_c L_1}{R_a}\right)^2}{\frac{(2\pi f_c L_1)^2}{R_1 R_a}-1}$$

and $R_2$ is determined by the equation $$R_2=\frac{\left(\frac{2\pi f_c L_2}{R_b}\right)^2}{\frac{(2\pi f_c L_2)^2}{R_2 R_b}-1}$$

where $R_a$ is the resistance of inductor $L_1$ and $R_b$ is the resistance of inductor $L_2$.

8. A network in accordance with claim 4 in which the dissipation in the inductors in taken into account in determining the values of $R_1$ and $R_2$ so that $R_1$ is determined by the equation $$R_1=\frac{\left(\frac{2\pi f_c L_1}{R_a}\right)^2}{\frac{(2\pi f_c L_1)^2}{R_1 R_a}-1}$$

and $R_2$ is determined by the equation $$R_2=\frac{\left(\frac{2\pi f_c L_2}{R_b}\right)^2}{\frac{(2\pi f_c L_2)^2}{R_2 R_b}-1}$$

where $R_a$ is the resistance of inductor $L_1$ and $R_b$ is the resistance of inductor $L_2$.

References Cited in the file of this patent

UNITED STATES PATENTS

| | | |
|---|---|---|
| 1,432,965 | Casper | Oct. 24, 1922 |
| 1,850,146 | Zobel | Mar. 22, 1932 |
| 2,024,900 | Wiener | Dec. 17, 1935 |
| 2,029,014 | Bode | Jan. 28, 1936 |
| 2,969,509 | Bangert | Jan. 24, 1961 |

UNITED STATES PATENT OFFICE

CERTIFICATE OF CORRECTION

Patent No. 3,135,930 June 2, 1964

Robert W. De Monte

It is hereby certified that error appears in the above numbered patent requiring correction and that the said Letters Patent should read as corrected below.

Column 4, line 61, for "$L_2$=.5110 $L_0$" read -- $L_1$=.5110 $L_0$ --; column 6, line 3, for "$R=\sqrt{L_0/L_0}$" read -- $R=\sqrt{L_0/C_0}$ --.

Signed and sealed this 13th day of October 1964.

(SEAL)
Attest:

ERNEST W. SWIDER
Attesting Officer

EDWARD J. BRENNER
Commissioner of Patents